(12) United States Patent
Toda et al.

(10) Patent No.: US 11,008,002 B2
(45) Date of Patent: May 18, 2021

(54) VEHICLE CONTROL DEVICE, VEHICLE CONTROL METHOD, AND PROGRAM FOR COLLISION AVOIDANCE

(71) Applicant: HONDA MOTOR CO., LTD., Tokyo (JP)

(72) Inventors: Akihiro Toda, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/164,897

(22) Filed: Oct. 19, 2018

(65) Prior Publication Data

US 2019/0118804 A1    Apr. 25, 2019

(30) Foreign Application Priority Data

Oct. 23, 2017   (JP) .............................. JP2017-204793

(51) Int. Cl.
  *B60W 30/09*    (2012.01)
  *B60W 10/20*    (2006.01)
  (Continued)

(52) U.S. Cl.
  CPC ............ *B60W 30/09* (2013.01); *B60W 10/18* (2013.01); *B60W 10/20* (2013.01); *B62D 6/00* (2013.01);
  (Continued)

(58) Field of Classification Search
  CPC .............................. B60W 30/09; B60W 10/18
  See application file for complete search history.

(56) References Cited

U.S. PATENT DOCUMENTS

| | | | |
|---|---|---|---|
| 2006/0178830 A1* | 8/2006 | Sherony | G01S 11/12 701/301 |
| 2006/0293856 A1* | 12/2006 | Foessel | G01S 13/931 701/301 |

(Continued)

FOREIGN PATENT DOCUMENTS

| | | |
|---|---|---|
| JP | 2006-154967 | 6/2006 |
| JP | 2006-236030 | 9/2006 |

(Continued)

OTHER PUBLICATIONS

Japanese Office Action for Japanese Patent Application No. 2017-204793 dated Aug. 6, 2019.

*Primary Examiner* — Jess Whittington
(74) *Attorney, Agent, or Firm* — Amin, Turocy & Watson, LLP

(57) ABSTRACT

A vehicle control device includes an avoidance determination unit configured to determine whether or not each of a structure and an oncoming vehicle is able to avoid a contact with a subject vehicle on the basis of a position of the structure and a position of the oncoming vehicle, and a driving control unit configured to control one or both of steering or acceleration and deceleration of the subject vehicle to cause the subject vehicle to travel and configured to stop the subject vehicle until the oncoming vehicle passes by the subject vehicle in a case where a state of a dead angle region of the structure is not able to be recognized, even in a case where it is determined that the contact between each of the structure and the oncoming vehicle and the subject vehicle is able to be avoided by the avoidance determination unit.

4 Claims, 10 Drawing Sheets

(51) Int. Cl.
*B62D 15/02* (2006.01)
*B62D 6/00* (2006.01)
*B60W 10/18* (2012.01)
*B60W 10/04* (2006.01)

(52) U.S. Cl.
CPC ......... *B62D 15/0265* (2013.01); *B60W 10/04* (2013.01); *B60W 2520/10* (2013.01); *B60W 2520/105* (2013.01); *B60W 2554/00* (2020.02); *B60W 2710/06* (2013.01); *B60W 2710/18* (2013.01); *B60W 2710/20* (2013.01)

(56) References Cited

U.S. PATENT DOCUMENTS

| | | | |
|---|---|---|---|
| 2007/0071311 A1* | 3/2007 | Rovira-Mas | G06K 9/00805 |
| | | | 382/154 |
| 2008/0097699 A1* | 4/2008 | Ono | B62D 15/0265 |
| | | | 701/300 |
| 2009/0303026 A1 | 12/2009 | Broggi et al. | |
| 2011/0234390 A1* | 9/2011 | Danner | B62D 15/025 |
| | | | 340/438 |
| 2013/0286188 A1* | 10/2013 | Foley | B60Q 11/00 |
| | | | 348/118 |
| 2016/0148510 A1 | 5/2016 | Vanholme | |
| 2017/0116862 A1* | 4/2017 | Inoue | G01C 21/3697 |
| 2018/0281786 A1* | 10/2018 | Oyaizu | B62D 6/00 |
| 2019/0051061 A1* | 2/2019 | Battles | G05D 1/0088 |
| 2019/0073904 A1* | 3/2019 | Heinla | G05D 1/0088 |

FOREIGN PATENT DOCUMENTS

| | | |
|---|---|---|
| JP | 2011-108016 | 6/2011 |
| JP | 2012-104029 | 5/2012 |
| JP | 2013-037601 | 2/2013 |
| JP | 2016-222143 | 12/2016 |
| JP | 2017-068589 | 4/2017 |
| JP | 2017-136968 | 8/2017 |
| WO | 2016/024314 | 2/2016 |
| WO | 2016/170646 | 10/2016 |
| WO | 2016/189727 | 12/2016 |
| WO | 2017/077598 | 5/2017 |

* cited by examiner

VEHICLE CONTROL DEVICE, VEHICLE CONTROL METHOD, AND PROGRAM FOR COLLISION AVOIDANCE

CROSS-REFERENCE TO RELATED APPLICATION

Priority is claimed on Japanese Patent Application No. 2017-204793, filed Oct. 23, 2017, the content of which is incorporated herein by reference.

BACKGROUND OF THE INVENTION

Field of the Invention

The present invention relates to a vehicle control device, a vehicle control method, and a program.

Description of Related Art

In recent years, research on automatically controlling a vehicle (for example, refer to Japanese Unexamined Patent Application, First Publication No. 2013-37601) has been conducted.

SUMMARY OF THE INVENTION

However, in the prior art, there was room for improvement in the aspect of traveling with more consideration for a traffic participant.

An aspect according to the present invention is made in consideration of such a circumstance, and an object of the aspect is to provide a vehicle control device, a vehicle control method, and a program capable of performing traveling with more consideration for a traffic participant.

In order to solve the above problem and achieve the object, the present invention adopts the following aspects.

(1) A vehicle control device according to an aspect of the present invention includes a recognition unit including a structure recognition unit configured to recognize a structure present on a road on which a subject vehicle travels and an oncoming vehicle recognition unit configured to recognize an oncoming vehicle, and recognizing a surrounding situation of the subject vehicle, an avoidance determination unit configured to determine whether or not contact between each of the structure and the oncoming vehicle and the subject vehicle is able to be avoided on the basis of a position of the structure recognized by the structure recognition unit and a position of the oncoming vehicle recognized by the oncoming vehicle recognition unit, and a driving control unit configured to control one or both of steering or acceleration and deceleration of the subject vehicle to cause the subject vehicle to travel and configured to stop the subject vehicle until the oncoming vehicle passes by the subject vehicle in a case where a state of a dead angle region of the structure is not able to be recognized by the recognition unit, even in a case where it is determined that the contact between each of the structure and the oncoming vehicle and the subject vehicle is able to be avoided by the avoidance determination unit.

(2) In the aspect of (1) described above, the driving control unit may stop the subject vehicle until the oncoming vehicle passes by the subject vehicle in a case where the state of the dead angle region of the structure of a size shielding a moving body that moves on the road on which the subject vehicle travels or the state of the dead angle region of the structure of a size such that the moving body is not able to be recognized from the subject vehicle is not able to be recognized by the recognition unit.

(3) In the aspect of (1) or (2) described above, in a case where the state of the dead angle region of the structure is not able to be recognized by the recognition unit, the driving control unit may generate a trajectory that passes by a side of the structure by setting a margin larger than a margin set between the structure and the subject vehicle in a region between the structure and the subject vehicle in order to determine whether or not the contact between the structure and the subject vehicle is able to be avoided by the avoidance determination unit, and may cause the subject vehicle to travel along the trajectory after the oncoming vehicle passes by the subject vehicle.

(4) In any one aspect of (1) to (3) described above, in a case where a moving body entering the dead angle region of the structure is present, the driving control unit may stop the subject vehicle until the oncoming vehicle passes by the host vehicle.

(5) In any one aspect of (1) to (3) described above, in a case where a moving body entering the dead angle region of the structure is present, the driving control unit may stop the subject vehicle until the moving body appears outside the dead angle region even if the oncoming vehicle passes by the subject vehicle.

(6) A vehicle control method according to an aspect of the present invention includes recognizing a surrounding situation of a subject vehicle by a recognition unit, recognizing a structure present on a road on which the subject vehicle travels by a structure recognition unit of the recognition unit, recognizing an oncoming vehicle by an oncoming vehicle recognition unit of the recognition unit, determining, by an avoidance determination unit, whether or not contact between each of the structure and the oncoming vehicle and the subject vehicle is able to be avoided on the basis of a position of the structure recognized by the structure recognition unit and a position of the oncoming vehicle recognized by the oncoming vehicle recognition unit, and controlling, by a driving control unit, one or both of steering or acceleration and deceleration of the subject vehicle to cause the subject vehicle to travel and stopping the subject vehicle until the oncoming vehicle passes by the subject vehicle in a case where a state of a dead angle region of the structure is not able to be recognized by the recognition unit, even in a case where it is determined that the contact between each of the structure and the oncoming vehicle and the subject vehicle is able to be avoided by the avoidance determination unit.

(7) A non-transitory computer readable storage medium according to an aspect of the present invention storing a program that causes a computer mounted in a subject vehicle to recognize a surrounding situation of the subject vehicle, recognize a structure present on a road on which the subject vehicle travels, recognize an oncoming vehicle, determine whether or not contact between each of the structure and the oncoming vehicle and the subject vehicle is able to be avoided on the basis of a position of the recognized structure and a position of the recognized oncoming vehicle, control one or both of steering or acceleration and deceleration of the subject vehicle to cause the subject vehicle to travel, and stop the subject vehicle until the oncoming vehicle passes by the subject vehicle in a case where a state of a dead angle region of the structure is not able to be recognized, even in a case where it is determined that the contact between each of the structure and the oncoming vehicle and the subject vehicle is able to be avoided.

According to the aspects of (1) to (7) described above, it is possible to perform traveling with more consideration for a traffic participant.

DETAILED DESCRIPTION OF THE INVENTION

Hereinafter, embodiments of a vehicle control device, a vehicle control method, and a program of the present invention will be described with reference to the drawings.

[Overall Constitution]

Figure 1:
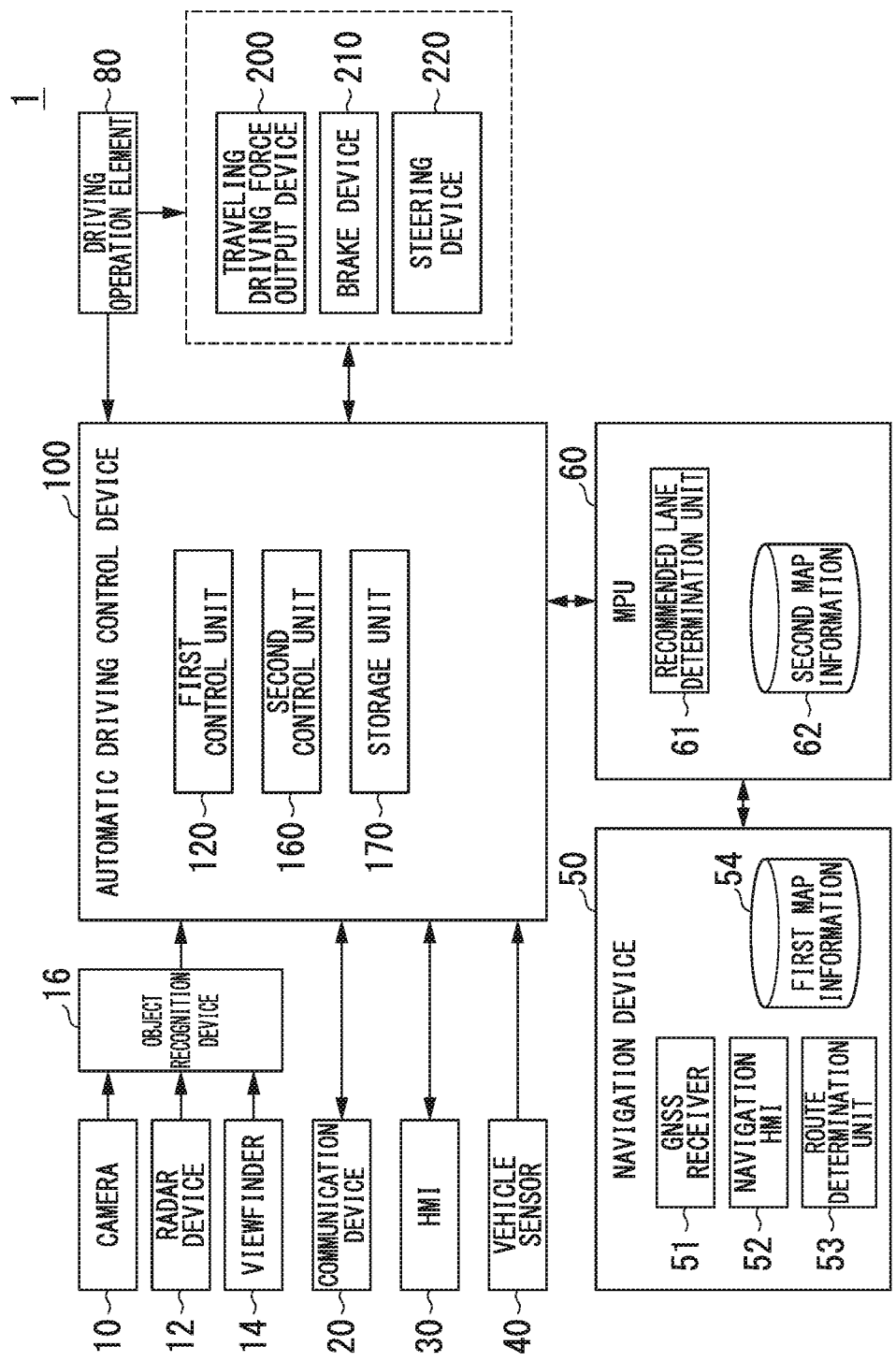
FIG. 1 is a constitution diagram of a vehicle system 1 using a vehicle control device according to an embodiment.

FIG. 1 is a constitution diagram of a vehicle system 1 using the vehicle control device according to the embodiment. A vehicle in which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. In a case where the electric motor is provided, the electric motor operates using electric power generated by a generator connected to the internal combustion engine or electric power discharged by a secondary battery or a fuel cell.

For example, the vehicle system 1 includes a camera 10, a radar device 12, a viewfinder 14, an object recognition device 16, a communication device 20, a human machine interface (HMI) 30, a vehicle sensor 40, a navigation device 50, a map positioning unit (MPU) 60, a driving operation element 80, an automatic driving control device 100, a traveling driving force output device 200, a brake device 210, and a steering device 220. Such devices and instruments are connected to each other by a multiple communication line such as a controller area network (CAN) communication line, a serial communication line, a wireless communication network, or the like. Note that the constitution shown in FIG. 1 is merely an example, and part of the constitution may be omitted or another constitution may be further added.

For example, the camera 10 is a digital camera using a solid imaging element such as a charge coupled device (CCD) or a complementary metal oxide semiconductor (CMOS). One or a plurality of cameras 10 are attached to arbitrary places on the vehicle (hereinafter, referred to as the subject vehicle M) in which the vehicle system 1 is mounted. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. One or a plurality of radar devices 12 are attached to arbitrary places on the subject vehicle M. The radar device 12 may detect the position and the speed of the object by a frequency modulated continuous wave (FM-CW) method.

The viewfinder 14 is a light detection and ranging (LIDAR). The viewfinder 14 irradiates light around the subject vehicle M and measures scattered light. The viewfinder 14 detects the distance to the object on the basis of a time from light emission to light reception. For example, the irradiated light is laser light of a pulse shape. One or a plurality of viewfinders 14 are attached to arbitrary places on the subject vehicle M.

The object recognition device 16 performs sensor fusion processing on a detection result by part or all of the camera 10, the radar device 12, and the viewfinder 14 to recognize a position, a type, a speed, and the like of the object. The object recognition device 16 outputs a recognition result to the automatic driving control device 100. In addition, the object recognition device 16 may output the detection result of the camera 10, the radar device 12, and the viewfinder 14 as they are to the automatic driving control device 100 as occasion demands.

For example, the communication device 20 communicates with another vehicle that is present around the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, a direction sensor that detects a direction of the subject vehicle M, and the like.

For example, the navigation device 50 includes a global navigation satellite system (GNSS) receiver 51, a navigation HMI 52, and a route determination unit 53, and holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system using an output of the vehicle sensor 40. The navigation HMI 52 includes a display device, a speaker, a touch panel, a key, and the like. Part or all of the navigation HMI 52 may be shared with the HMI 30 that will be described later. For example, the route determination unit 53 determines a route (hereinafter referred to as a route on a map) from the position of the subject vehicle M specified by the GNSS receiver 51 (or an input arbitrary position) to a destination input by the occupant using the navigation HMI 52 by referring to the first map information 54. For example, the first map information 54 is information in which a road shape is expressed by a link indicating a road and nodes connected by the link. The first map information 54 may include a curvature of the road, point of interest (POI) information, or the like. The route on the map determined by the route determination unit 53 is output to the MPU 60. In addition, the navigation device 50 may perform route guidance using the navigation HMI 52 on the basis of the route on the map determined by the route determination unit 53. In addition, for example, the navigation device 50 may be realized by a function of a terminal device such as a smartphone or a tablet terminal possessed by the user. In addition, the navigation device 50 may transmit a current position and a destination to a navigation server through the communication device 20 and acquire the route on the map returned from the navigation server.

For example, the MPU 60 functions as a recommended lane determination unit 61 and holds second map information 62 in the storage device such as an HDD or a flash memory. The recommended lane determination unit 61 divides the route provided from the navigation device 50 into a plurality of blocks (for example, divides the route into intervals of 100 [m] in a vehicle traveling direction) and determines a recommended lane for each block by referring to the second map information 62. The recommended lane determination unit 61 determines the number of a lane from the left that the vehicle travels in.

In a case where a branching position, a merging position, or the like is present on the route, the recommended lane determination unit 61 determines the recommended lane so that the subject vehicle M is able to travel on a reasonable travel route for progressing to a branch destination.

The second map information 62 is map information with accuracy higher than that of the first map information 54. For example, the second map information 62 may include information on the center of a lane, information on a boundary of a lane, or the like. In addition, the second map information 62 may include road information, traffic regulation information, address information (an address and a postal code), facility information, telephone number information, and the like. The second map information 62 may be updated at any time by accessing another device using the communication device 20.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to one or both of the automatic driving control device 100, or the traveling driving force output device 200, the brake device 210, and the steering device 220.

For example, the automatic driving control device 100 includes a first control unit 120, a second control unit 160, and a storage unit 170. For example, each of the first control unit 120 and the second control unit 160 is realized by a hardware processor such as a central processing unit (CPU) executing a program (software). In addition, some or all of such constitution elements may be realized by hardware (a circuit unit including a circuitry) such as a large scale integration (LSI), an application specific integrated circuit (ASIC), a field-programmable gate array (FPGA), or a graphic processing unit (GPU), or may be realized by software and hardware in cooperation.

Figure 2:
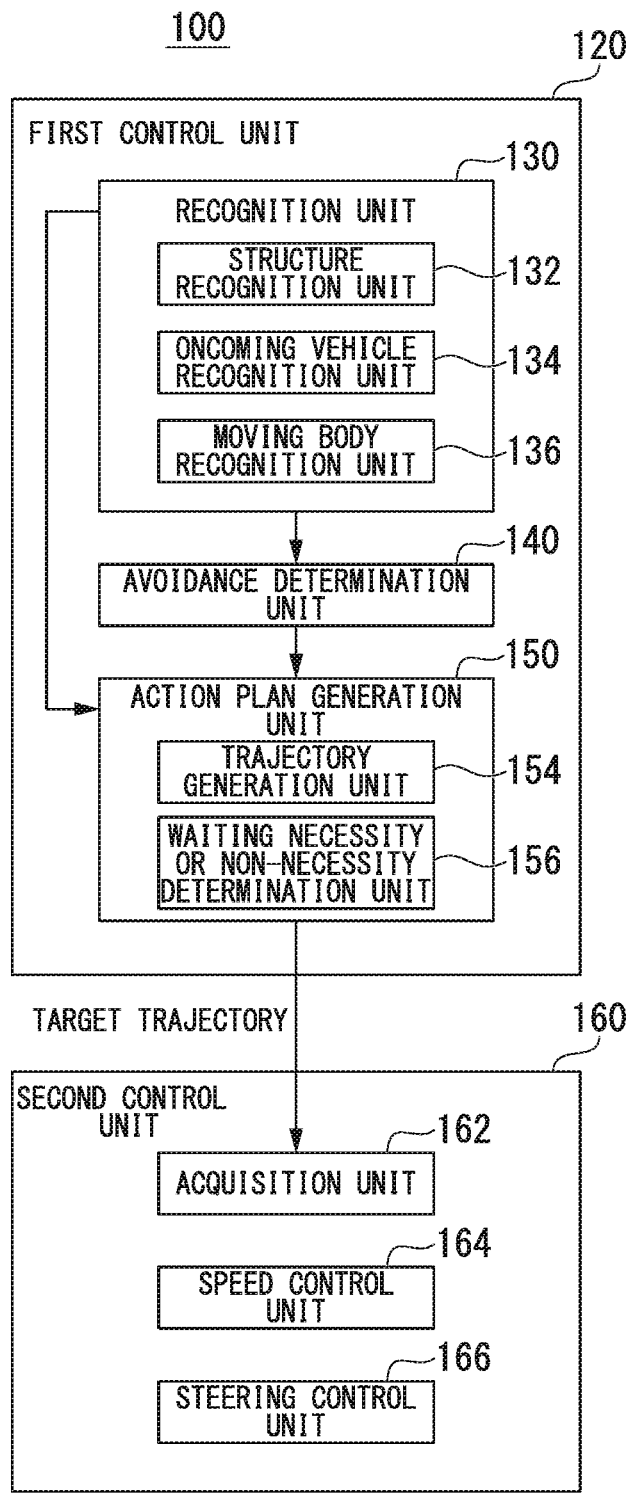
FIG. 2 is a functional constitution diagram of a first control unit 120 and a second control unit 160.

FIG. 2 is a functional constitution diagram of the first control unit 120 and the second control unit 160. For example, the first control unit 120 includes a recognition unit 130, an avoidance determination unit 140, and an action plan generation unit 150. For example, the first control unit 120 realizes a function of artificial intelligence (AI) and a function of a previously given model in parallel. For example, a function of "recognizing an intersection" is executed in parallel with recognition of an intersection by deep learning or the like and recognition based on a previously given condition (for example, there is a pattern matching signal, a road sign, or the like) and is realized by giving scores to both sides and comprehensively evaluating the scores. Therefore, reliability of automatic driving is guaranteed.

The recognition unit 130 recognizes the position of the object around the subject vehicle M, and a surrounding situation of the subject vehicle M including states such as the speed and the acceleration, on the basis of information input from the camera 10, the radar device 12, and the viewfinder 14 through the object recognition device 16. For example, the recognition unit 130 includes a structure recognition unit 132, an oncoming vehicle recognition unit 134, and a moving body recognition unit 136.

The structure recognition unit 132 recognizes a structure OB present on a road on which the subject vehicle M travels. For example, the "structure OB present on the road" may be a structure installed on the road such as a utility pole, a signboard, a sign, or the like, or may be a structure temporarily present on the road such as a parked vehicle or a stopped vehicle on the road.

The oncoming vehicle recognition unit 134 recognizes an oncoming vehicle m (refer to FIG. 3) present on the road on which the subject vehicle M travels. The oncoming vehicle m is a vehicle traveling on the road on which the subject vehicle M travels in a direction opposite to the subject vehicle M.

The moving body recognition unit 136 recognizes a moving body TP other than the oncoming vehicle m present on the road on which the subject vehicle M travels. The moving body TP is a pedestrian, a bicycle, a motorcycle, or the like, but is not limited thereto. The moving body TP may be a moving body other than the oncoming vehicle m among moving bodies present on the road on which the subject vehicle M travels. The moving body TP may be referred to as a "traffic participant" or a "moving traffic participant." Note that the structure recognition unit 132, the oncoming vehicle recognition unit 134, and the moving body recognition unit 136 will be described later in detail.

For example, the position of the object around the subject vehicle M as described above is recognized as a position in absolute coordinates using a representative point (a center of gravity, a drive shaft center, or the like) of the subject vehicle M as an origin and is used in control.

The position of the object may be represented by the representative point such as the center of gravity or a corner of the object, or may be represented by an expressed region. A "state" of the object may include both of an acceleration and a jerk of the object, or an "action state" (for example, whether or not the object is changing lanes or trying to change lanes).

In addition, the recognition unit 130 recognizes a shape of a curve on which the subject vehicle M is about to pass on the basis of the captured image of the camera 10. The recognition unit 130 converts the shape of the curve from the captured image of the camera 10 to a real plane, and for example, the recognition unit 130 outputs information expressed using two-dimensional point row information or an equivalent model the same as the two-dimensional point row information to the action plan generation unit 150 as information indicating the shape of the curve.

In addition, for example, the recognition unit 130 recognizes a lane (a traveling lane) on which the subject vehicle M is traveling. For example, the recognition unit 130 recognizes the traveling lane by comparing a pattern of a road lane marking (for example, an arrangement of a solid line and a broken line) obtained from the second map information 62 with a pattern of a road lane marking around the subject vehicle M recognized from the image captured by the camera 10. In addition, the recognition unit 130 may recognize the traveling lane by recognizing a traveling road boundary (a road boundary) including a road lane marking, a road shoulder, a curb stone, a median strip, a guard rail, and the like, and is not limited to recognizing road lane markings. In this recognition, the position of the subject vehicle M acquired from the navigation device 50 or a processing result by an INS may be added. In addition, the recognition unit 130 recognizes a temporary stop line, an obstacle, a red signal, a toll gate, and other road events.

The recognition unit 130 recognizes the position and a posture of the subject vehicle M with respect to the traveling lane when recognizing the traveling lane. For example, the recognition unit 130 may recognize a deviation of a reference point of the subject vehicle M from a center of the lane and an angle formed with respect to a line connecting the center of the lane of a traveling direction of the subject vehicle M as a relative position and the posture of the subject vehicle M with respect to the traveling lane. In addition, instead of this, the recognition unit 130 may recognize a position of the reference point of the subject vehicle M with respect to one of side end portions (the road lane marking or the road boundary) of the traveling lane as the relative position of the subject vehicle M with respect to the traveling lane.

The recognition unit 130 outputs information recognized by the recognition unit 130 to the avoidance determination unit 140 and the action plan generation unit 150.

The avoidance determination unit 140 determines whether or not contact between the object around the subject vehicle M and the subject vehicle M is able to be avoided based on the information recognized by the recognition unit 130. For example, the avoidance determination unit 140 determines whether or not there is a space on the road on which the subject vehicle M travels in which the subject vehicle M is able to travel while avoiding the contact between the object around the subject vehicle M and the subject vehicle M. A determination result determined by the avoidance determination unit 140 is output to the action plan generation unit 150. In addition, the avoidance determination unit 140 will be described later in detail.

The action plan generation unit 150 generates an action plan of the subject vehicle M based on the information input from the object recognition device 16, the information input from the MPU 60, the information recognized by the recognition unit 130, and the determination result determined by the avoidance determination unit 140. In principle, the action plan generation unit 150 generates the action plan sequentially executed in the automatic driving so that the subject vehicle travels in the recommended lane determined by the recommended lane determination unit 61 and responds to the surrounding situation of the subject vehicle M. The action plan generation unit 150 includes, for example, a trajectory generation unit 154 and a waiting necessity or non-necessity determination unit 156.

The trajectory generation unit 154 generates a target trajectory in which the subject vehicle M travels in the future based on various pieces of the information and the like input to the action plan generation unit 150.

When a predetermined condition is satisfied, the waiting necessity or non-necessity determination unit 156 determines whether or not it is necessary to cause the subject vehicle M to wait without causing the subject vehicle M to travel. The "predetermined condition" is, for example, a case where the structure OB and the oncoming vehicle m are recognized on the road on which the subject vehicle M travels. In addition, the waiting necessity or non-necessity determination unit 156 will be described later in detail.

The second control unit 160 controls one or both of the steering or the acceleration and deceleration of the subject vehicle M to cause the subject vehicle M to travel. The second control unit 160 controls the traveling driving force output device 200, the brake device 210, and the steering device 220 so that the subject vehicle M passes through the target trajectory generated by the action plan generation unit 150 at a scheduled time. In the present embodiment, a functional unit including the action plan generation unit 150 of the first control unit 120 and the second control unit 160 corresponds to an example of a "driving control unit".

For example, the second control unit 160 includes an acquisition unit 162, a speed control unit 164, and a steering control unit 166. The acquisition unit 162 acquires information on the target trajectory (a trajectory point) generated by the action plan generation unit 150 and stores the information in a memory (not shown). The speed control unit 164 controls the traveling driving force output device 200 or the brake device 210 on the basis of a speed element accompanying the target trajectory stored in the memory. The steering control unit 166 controls the steering device 220 according to a degree of curvature of the target trajectory stored in the memory. For example, processing of the speed control unit 164 and the steering control unit 166 is realized by a combination of a feed-forward control and a feedback control. As an example, the steering control unit 166 is executed by a combination of a feed-forward control according to a curvature of the road ahead of the subject vehicle M and a feedback control based on the deviation from the target trajectory.

Returning to FIG. 1, the traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and an ECU that controls the internal combustion engine, the electric motor, the transmission, and the like. The ECU controls the above-described constitutions according to the information input from the second control unit 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second control unit 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. In addition, the brake device 210 is not limited to the constitution described above, and may be an electronic control method oil pressure brake device that controls an actuator according to the information input from the second control unit 160 to transfer the oil pressure of the master cylinder to the cylinder.

For example, the steering device 220 includes a steering ECU and an electric motor.

For example, the electric motor changes a direction of steerable wheels by applying a force to a rack and pinion mechanism. The steering ECU changes the direction of the steerable wheels by driving the electric motor according to the information input from the second control unit 160 or the information input from the driving operation element 80.

Figure 3:
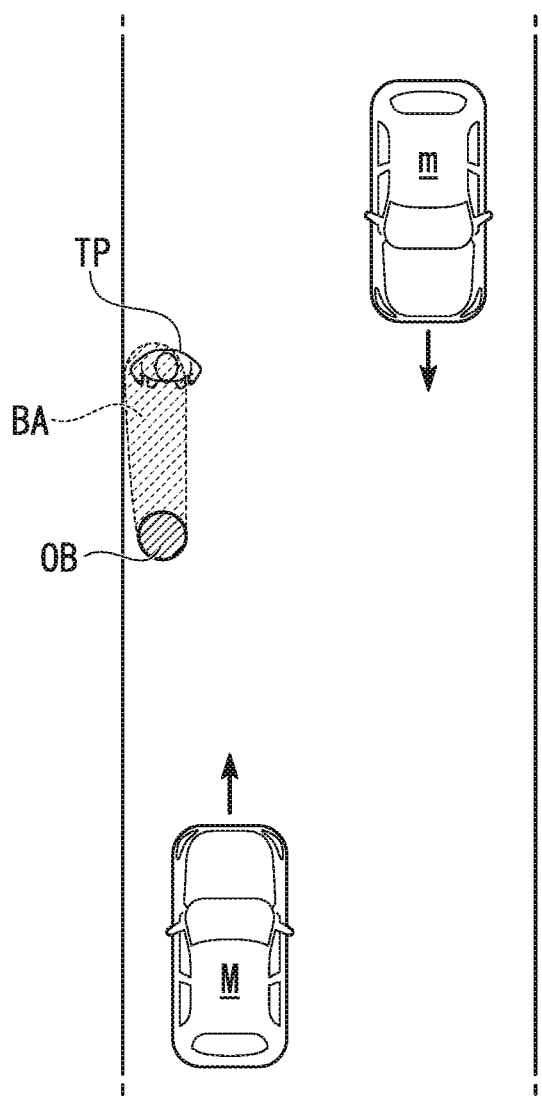
FIG. 3 is a diagram illustrating an example of a scene on a road on which a subject vehicle M travels.
Figure 4:
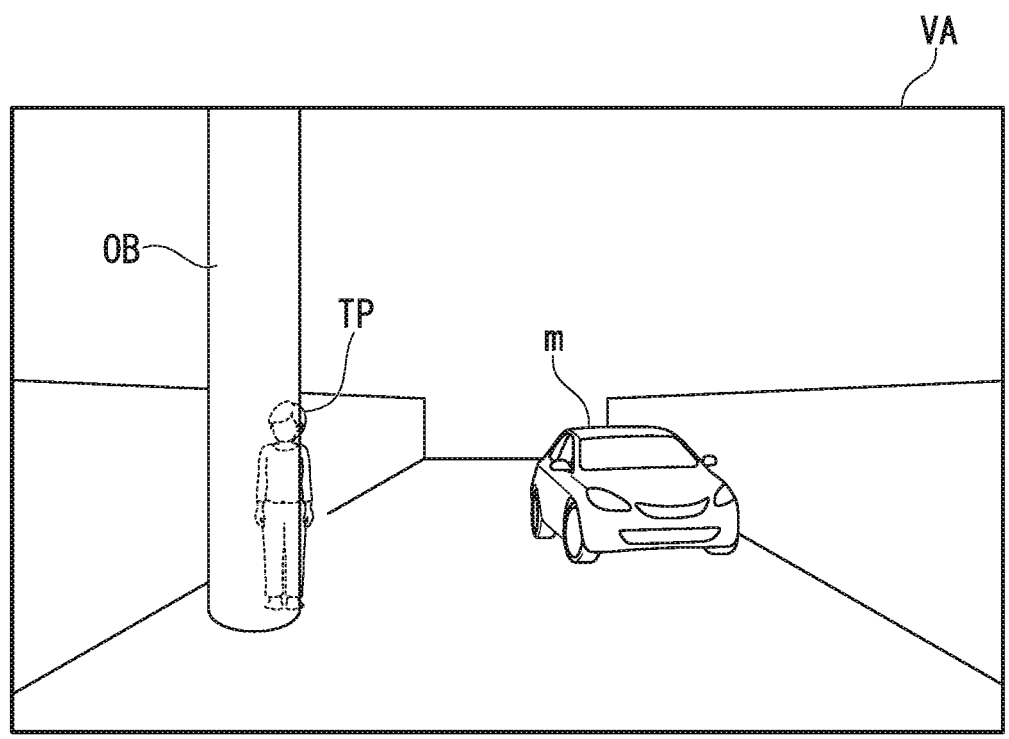
FIG. 4 is a diagram illustrating part of a recognition region VA acquired through an object recognition device 16 in the scene shown in FIG. 3.

Next, a function of the vehicle system 1 in a case where the structure OB and the oncoming vehicle m are present on the road on which the subject vehicle M travels will be described. FIG. 3 is a diagram illustrating an example of a scene in which the structure OB and the oncoming vehicle m are present on the road on which the subject vehicle M travels. FIG. 4 is a diagram illustrating part of a recognition region VA acquired through the object recognition device 16 in the scene shown in FIG. 3.

In a case where the structure OB is present on the road on which the subject vehicle M travels, the structure recognition unit 132 recognizes the presence of the structure OB, and the size, the shape, the position, and the like of the structure OB. In the present example, the structure OB is positioned at an own lane side of the road (on a left side in a region where a law is enforced to drive on the left).

In addition, the structure recognition unit 132 determines whether or not there is a region (hereinafter, referred to as a dead angle region BA) that cannot be recognized by the recognition unit 130 behind the structure OB as viewed from the subject vehicle M. For example, in the structure recognition unit 132, a size of a minimum moving body TP among the moving bodies TP on the road on which the subject vehicle M needs to avoid contact is registered in advance. For example, the "minimum moving body TP" may be a child walking by oneself. In addition, in a case where there is a structure OB of a size that completely shields the registered minimum moving body TP or in a case where there is a structure OB of a size that causes the subject vehicle M not to recognize the moving body TP although the structure OB does not completely shield the registered minimum moving body TP, the structure recognition unit 132 determines that there is the dead angle region BA behind the structure OB. For example, "the structure OB having a size that causes the subject vehicle M not to recognize the moving body TP" means a structure OB having a size capable of concealing the moving body TP so that an area of the moving body TP appearing in the recognition region VA is smaller than the predetermined area in a case where the moving body TP is recognized by the recognition unit 130 in a case where a portion equal to or larger than a predetermined area of the moving body TP is present in a recognition region VA (refer to FIG. 4) acquired through the object recognition device 16.

In a case where the oncoming vehicle m is present on the road on which the subject vehicle M travels, the oncoming vehicle recognition unit 134 recognizes a presence of the oncoming vehicle m, and a size, a position, and the like of the oncoming vehicle m. For example, the oncoming vehicle recognition unit 134 recognizes the oncoming vehicle m positioned farther than the structure OB when viewed from the subject vehicle M.

In a case where the moving body TP other than the oncoming vehicle m is present on the road on which the subject vehicle M travels, the moving body recognition unit 136 recognizes a presence of the moving body TP, and a size and a position of the moving body TP.

For example, in a case where the recognized moving body TP enters the dead angle region BA of the structure OB and thus the moving body recognition unit 136 is not able to recognize the moving body TP, the moving body recognition unit 136 recognizes that the moving body TP entered the dead angle region BA is present. In a case where the moving body TP that was not able to be recognized appears outside the dead angle region BA, the moving body recognition unit 136 recognizes the moving object TP again.

Figure 5:
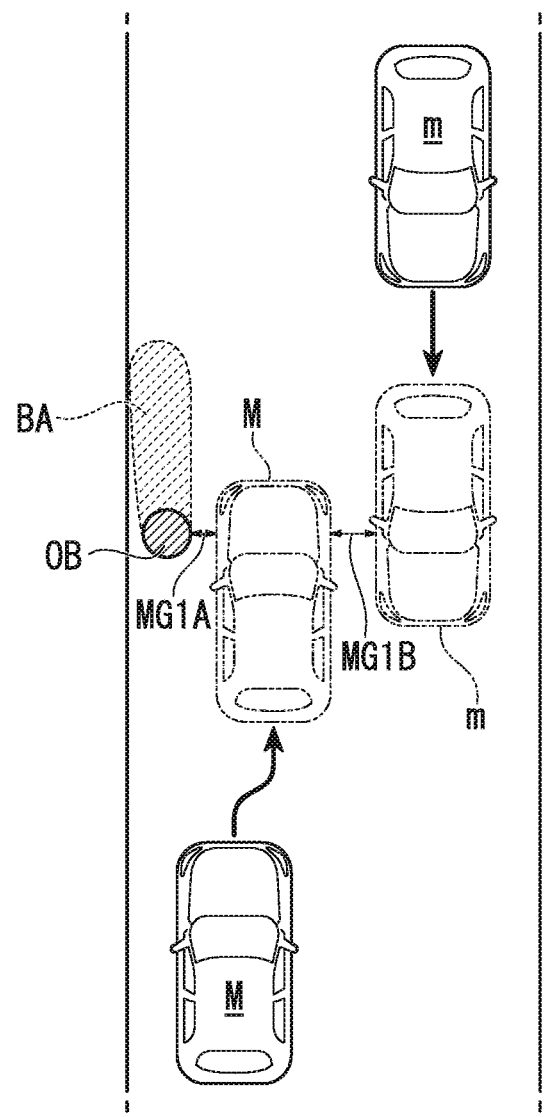
FIG. 5 is a diagram for describing avoidance determination by an avoidance determination unit 140 in the scene shown in FIG. 3.

Next, the avoidance determination unit 140 will be described. FIG. 5 is a diagram for describing an avoidance determination by the avoidance determination unit 140 in the scene shown in FIG. 4. In a case where the structure OB and the oncoming vehicle m are present on the road on which the subject vehicle M travels, the avoidance determination unit 140 determines whether or not the contact between each of the structure OB and the oncoming vehicle m and the subject vehicle M is able to be avoided even in a case where the subject vehicle M continues traveling without stopping.

In the present embodiment, the avoidance determination unit 140 determines whether or not the contact between each of the structure OB and the oncoming vehicle m and the subject vehicle M is able to be avoided, on the basis of the position of the structure OB recognized by the structure recognition unit 132 and the position of the oncoming vehicle m recognized by the oncoming vehicle recognition unit 134. For example, the avoidance determination unit 140 determines whether or not there is a space in which the subject vehicle M is able to travel between the structure OB and the oncoming vehicle m in a state in which the oncoming vehicle m goes straight from a current position and is aligned with the structure OB in a width direction of the road.

Specifically, a margin MG1A is set as a margin (a gap) to be secured between the structure OB and the subject vehicle M in the avoidance determination unit 140. Similarly, the avoidance determination unit 140 sets a margin MG1B as a margin to be secured between the oncoming vehicle m and the subject vehicle M. The sizes of the margin MG1A and the margin MG1B may be equal to or different from each other. For example, the structure OB is a stationary object and the oncoming vehicle is the moving body.

Therefore, the margin MG1B may be larger than the margin MG1A. In addition, in a case where the oncoming vehicle m goes straight from the current position and the structure OB, the subject vehicle M, and the oncoming vehicle m are arranged in the width direction of the road, in a case where the gap between the structure OB and the subject vehicle M is equal to or larger than the margin MG1A, and the gap between the oncoming vehicle m and the subject vehicle M is equal to or larger than the margin MG1B, the avoidance determination unit 140 determines that the contact between each of the structure OB and the oncoming vehicle and the subject vehicle M is able to be avoided. In addition, the margin MG1A and the margin MG1B may be different according to the speed of the subject vehicle M and may be different according to the speed of the oncoming vehicle m. For example, the sizes of the margins MG1A and MG1B are stored in the storage unit 170.

Next, the waiting necessity or non-necessity determination unit 156 will be described. In a case where the structure OB and the oncoming vehicle m are present on the road on which the subject vehicle travels, the waiting necessity or non-necessity determination unit 156 determines whether or not the subject vehicle M stops and waits. In the present embodiment, in a case where a state of the dead angle region BA of the structure OB is not able to be recognized by the recognition unit 130, the waiting necessity or non-necessity determination unit 156 determines that it is necessary to stop the subject vehicle M until the oncoming vehicle m passes by the subject vehicle M, even in a case where the avoidance determination unit 140 determines that the contact between each of the structure OB and the oncoming vehicle m and the subject vehicle M is able to be avoided. In the present embodiment, in a case where the state of the dead angle region BA of the structure OB is not able to be recognized by the recognition unit 130, the waiting necessity or non-necessity determination unit 156 determines that it is necessary to stop the subject vehicle M until the oncoming vehicle m passes by the subject vehicle M, regardless of whether or not the presence of the moving body TP entered the dead angle region BA is recognized. In a case where the waiting necessity or non-necessity determination unit 156 determines that it is necessary to stop the subject vehicle M until the oncoming vehicle m passes by the subject vehicle M, the waiting necessity or non-necessity determination unit 156 generates a waiting plan for causing the subject vehicle M to wait and outputs the generated waiting plan to the second control unit 160.

Figure 6:
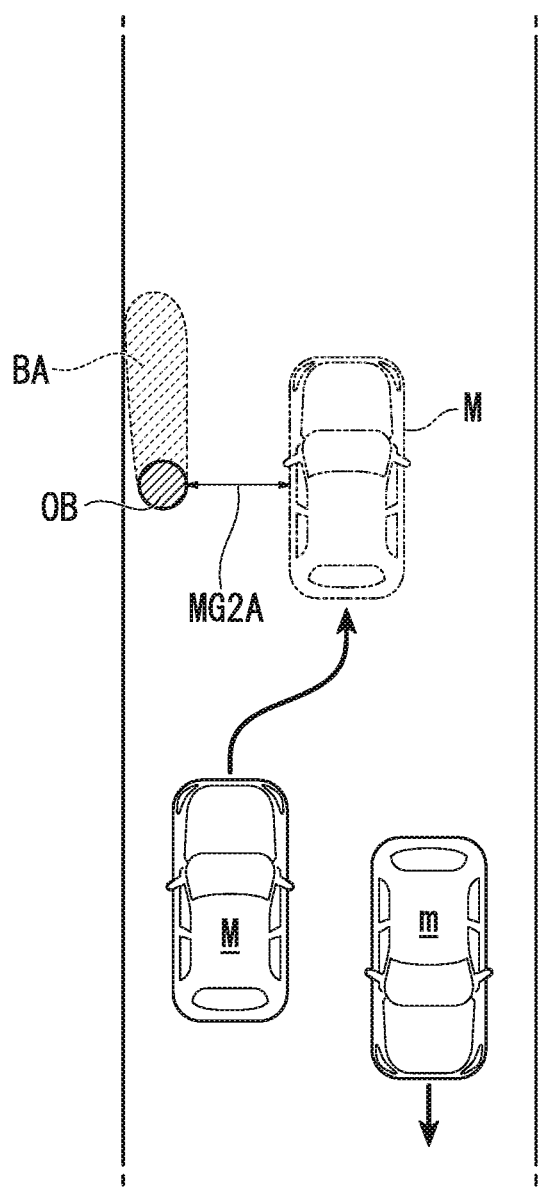
FIG. 6 is a diagram for describing a target trajectory generated by a trajectory generation unit 154 in the scene shown in FIG. 3.

Next, the trajectory generation unit 154 will be described. FIG. 6 is a diagram for describing the target trajectory generated by the trajectory generation unit 154 in the scene shown in FIG. 3. In a case where the waiting necessity or non-necessity determination unit 156 determines that it is necessary to stop the subject vehicle M until the oncoming vehicle m passes by the subject vehicle M, the trajectory generation unit 154 generates a target trajectory for moving the subject vehicle M after causing the subject vehicle M to wait. In the present embodiment, in consideration of a possibility that the moving body TP avoids the structure OB and comes out (for example, pops out) from the dead angle region BA of the structure OB, the trajectory generation unit 154 generates a target trajectory greatly detouring the structure OB.

For example, in a case where there is the dead angle region BA in the structure OB, the trajectory generation unit 154 sets a margin MG2A larger than the margin MG1A as the margin to be secured between the structure OB and the subject vehicle M to generate the target trajectory of the subject vehicle M passing through the side of the structure OB. Here, the margin MG2A may be different according to the speed of the subject vehicle M. "The margin MG2A larger than the margin MG1A" means that the margin MG2A is larger than the margin MG1A in a case where the margin MG1A is compared with the margin MG2A set with respect to the same speed of the subject vehicle M. For example, a size of the margin MG2A is stored in the storage unit 170. The trajectory generation unit 154 outputs the generated target trajectory to the second control unit 160.

Next, the second control unit 160 will be described. In a case where the waiting plan is generated by the waiting necessity or non-necessity determination unit 156, the second control unit 160 stops the subject vehicle M and causes the subject vehicle M to wait according to the waiting plan. That is, the second control unit 160 stops the subject vehicle M until the oncoming vehicle m passes by the subject vehicle M in a case where the state of the dead angle region BA of the structure OB is not able to be recognized, even in a case where the avoidance determination unit 140 determines that the contact between each of the structure OB and the oncoming vehicle m and the subject vehicle M is able to be avoided. In the present embodiment, in a case where the state of the dead angle region BA of the structure OB of the size shielding the moving body TP moving on the road on which the subject vehicle M travels is not able to be recognized or in a case where the state of the dead angle region BA of the structure OB of the size causing the subject vehicle M not to recognize the moving body TP is not able to be recognized, the second control unit 160 stops the subject vehicle M until the oncoming vehicle m passes by the subject vehicle M.

The second control unit 160 causes the subject vehicle M to travel on the basis of the target trajectory generated by the trajectory generation unit 154 after the oncoming vehicle m passes by the subject vehicle M. That is, the second control unit 160 causes the subject vehicle M to travel so that the subject vehicle M greatly detours the structure OB.

Next, an example of a flow of processing executed by the automatic driving control device 100 will be described.

Figure 7:
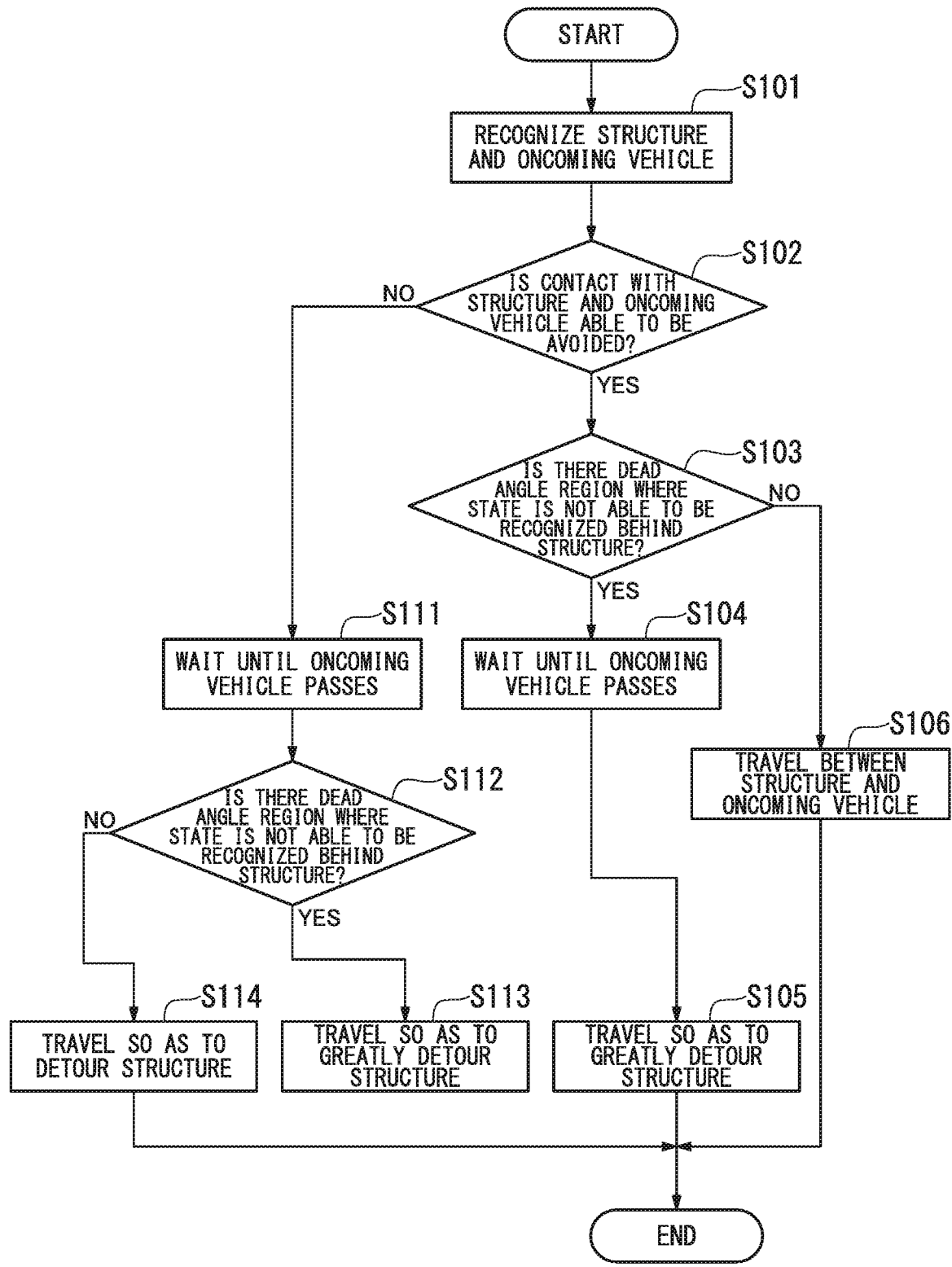
FIG. 7 is flowchart illustrating an example of a flow of processing executed by an automatic driving control device 100.

FIG. 7 is flowchart illustrating the example of the flow of the processing executed by the automatic driving control device 100. In addition, the following flow is repeatedly executed every time the structure OB and the oncoming vehicle m are recognized on the road on which the subject vehicle M travels.

First, the recognition unit 130 recognizes the structure OB and the oncoming vehicle m present on the road on which the subject vehicle M travels, on the basis of the information input through the object recognition device 16 (step S101).

Next, the avoidance determination unit 140 determines whether or not the contact between each of the structure OB and the oncoming vehicle m and the subject vehicle M is able to be avoided even in a case where the subject vehicle M continues traveling, on the basis of the position of the structure recognized by the structure recognition unit 132 and the position of the oncoming vehicle m recognized by the oncoming vehicle recognition unit 134 (step S102).

In a case where the avoidance determination unit 140 determines that the contact between each of the structure OB and the oncoming vehicle m and the subject vehicle M is able to be avoided, the recognition unit 130 determines whether or not there is the dead angle region BA where the state is not able to be recognized behind the structure OB (step S103).

In a case where the recognition unit 130 determines that there is the dead angle region BA where the state is not able to be recognized behind the structure OB, the waiting necessity or non-necessity determination unit 156 generates the waiting plan for stopping the subject vehicle M and causing the subject vehicle M to wait until the oncoming vehicle m passes by the subject vehicle M, even in a case where the avoidance determination unit 140 determines that the contact between each of the structure OB and the oncoming vehicle m and the subject vehicle M is able to be avoided. The second control unit 160 stops the subject vehicle M and causes the subject vehicle M to wait until the oncoming vehicle m passes by the subject vehicle M, on the basis of the waiting plan generated by the waiting necessity or non-necessity determination unit 156 (step S104). In this case, in consideration of the possibility that the moving body TP comes out from the dead angle region BA of the structure OB, the trajectory generation unit 154 generates the target trajectory greatly detouring the structure OB. The second control unit 160 travels so as to greatly detour the structure OB and passes the side of the structure OB on the basis of the target trajectory generated by the trajectory generation unit 154 after the oncoming vehicle m passes by the subject vehicle M (step S105).

On the other hand, in a case where the recognition unit 130 determines that there is not the dead angle region BA where the state is not able to be recognized behind the structure OB, the trajectory generation unit 154 generates the target trajectory traveling in the space present between the structure OB and the oncoming vehicle m in a situation where the structure OB and the oncoming vehicle m are arranged in the width direction of the road. In addition, the second control unit 160 does not stop the subject vehicle M, does not cause the subject vehicle M to wait, and causes the subject vehicle M to travel in the space between the structure OB and the oncoming vehicle m on the basis of the target trajectory generated by the trajectory generation unit 154 (step S106).

In addition, in step S102, when the subject vehicle M continues the traveling, in a case where it is determined that the contact between each of the structure OB and the oncoming vehicle m and the subject vehicle M is not able to be avoided, the waiting necessity or non-necessity determination unit 156 generates the waiting plan for stopping the subject vehicle M and causing the subject vehicle M to wait until the oncoming vehicle m passes by the subject vehicle M. The second control unit 160 stops the subject vehicle M and causes the subject vehicle M to wait until the oncoming vehicle m passes by the subject vehicle M, on the basis of the waiting plan generated by the waiting necessity or non-necessity determination unit 156 (step S111).

Next, the recognition unit 130 determines whether or not there is the dead angle region BA where the state is not able to be recognized behind the structure OB (step S112). Note that step S112 may be performed substantially at the same time as step S111 or before step S111.

In a case where the recognition unit 130 determines that there is the dead angle region BA where the state is not able to be recognized behind the structure OB, in consideration of the possibility that the moving body TP comes out from the dead angle region BA of the structure OB, the trajectory generation unit 154 generates the target trajectory greatly detouring the structure OB. The second control unit 160 travels so as to greatly detour the structure OB and passes the side of the structure OB on the basis of the target trajectory generated by the trajectory generation unit 154 (step S113).

On the other hand, in a case where the recognition unit 130 determines that there is not the dead angle region BA where the state is not able to be recognized behind the structure OB, the trajectory generation unit 154 generates a target trajectory that simply avoids the structure OB. For example, "the target trajectory that simply avoids the structure OB" is a trajectory that passes the side of the structure OB with the margin MG1A between the structure OB and the subject vehicle M. The second control unit 160 travels so as to avoid the structure OB and passes the side of the structure OB on the basis of the target trajectory generated by the trajectory generation unit 154 (step S114).

According to the constitution as described above, it is possible to perform traveling with more consideration with respect to a traffic participant. That is, the vehicle system 1 of the present embodiment stops the subject vehicle M until the oncoming vehicle passes by the subject vehicle M in a case where the state of the dead angle region BA of the structure OB is not able to be recognized, even in a case where the avoidance determination unit 140 determines that the contact between each of the structure OB and the oncoming vehicle m and the subject vehicle M is able to be avoided. According to such a constitution, in a case where the state of the dead angle region BA of the structure OB is not able to be recognized, it is possible to stop the subject vehicle M and prepare for a case where the moving body TP (the traffic participant) is hidden in the dead angle region BA, even in a case where there is a sufficient space between the structure OB and the oncoming vehicle m to enable the subject vehicle M to travel. Therefore, it is possible to suppress an occurrence of an emergency avoidance operation of the subject vehicle M even in a case where the moving body TP is pops out from the dead angle region BA. Therefore, it is possible to perform traveling with more consideration with respect to the traffic participant.

In the present embodiment, in a case where the state of the dead angle region BA of the structure OB is not able to be recognized, the vehicle system 1 generates the trajectory of the subject vehicle M that passes by the side of the structure OB by setting the margin MG2A larger than the margin MG1A set between the structure OB and the subject vehicle M in the region between the structure OB and the subject vehicle M in order to determine whether or not the contact between the structure OB and the subject vehicle M is able to be avoided by the avoidance determination unit 140. According to such a constitution, it is possible to cause the subject vehicle M to travel so that the subject vehicle M greatly detour the structure OB after the oncoming vehicle m passes by the subject vehicle M. Therefore, even in a case where the moving body TP is hidden in the dead angle region BA of the structure OB, it is possible to suppress an occurrence of an emergency avoidance operation of the subject vehicle M, and it is possible to perform traveling with more consideration with respect to the traffic participant.

Next, several modification examples of the above-described embodiment will be described. Note that constitutions other than those described below in such a modification example are the same as the constitutions of the above-described embodiment.

First Modification Example

Figure 8:
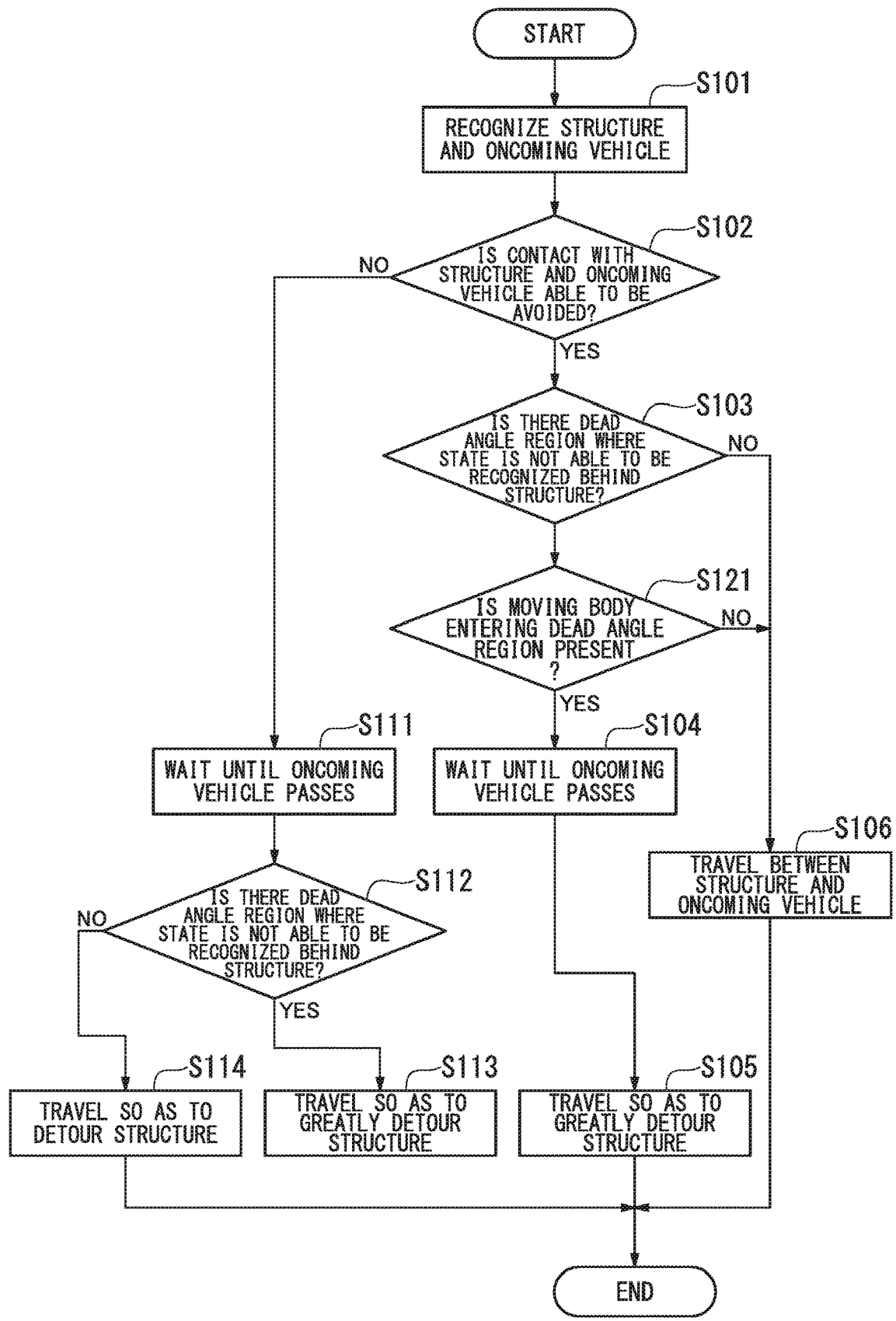
FIG. 8 is a flowchart illustrating an example of a flow of processing executed by the automatic driving control device 100 of a first modification example.

FIG. 8 is a flowchart illustrating an example of a flow of processing executed by the automatic driving control device 100 of the first modification example. In the present modification example, in a case where the avoidance determination unit 140 determines that the contact between each of the structure OB and the oncoming vehicle m and the subject vehicle M is able to be avoided and the recognition unit 130 recognizes that the moving body TP entering the dead angle region BA is present, the waiting necessity or non-necessity determination unit 156 generates a waiting plan for stopping the subject vehicle M and causing the subject vehicle M to wait.

That is, in the present modification example, in a case where step S103 is YES, the waiting necessity or non-necessity determination unit 156 determines whether or not the recognition unit 130 recognizes that the moving body TP entering the dead angle region BA is present (step S121). In addition, in a case where the recognition unit 130 recognizes that the moving body TP entering the dead angle region BA is present, the waiting necessity or non-necessity determination unit 156 generates the waiting plan for stopping the subject vehicle M and causing the subject vehicle M to wait (step S104). On the other hand, even in a case where there is the dead angle region BA where the state is not able to be recognized behind the structure OB, in a case where the recognition unit 130 does not recognize that the moving body TP entering the dead angle region BA is present, the waiting necessity or non-necessity determination unit 156 causes the second control unit 160 not to stop, not to wait, and to travel the space between the structure OB and the oncoming vehicle m (step S106).

According to such a constitution, for example, only in a case where the moving body TP entering the dead angle region BA of the structure OB is present, it is possible to stop the subject vehicle M and to cause the subject vehicle M to wait. Therefore, it is possible to perform smoother traveling by the subject vehicle M.

Second Modification Example

Figure 9:
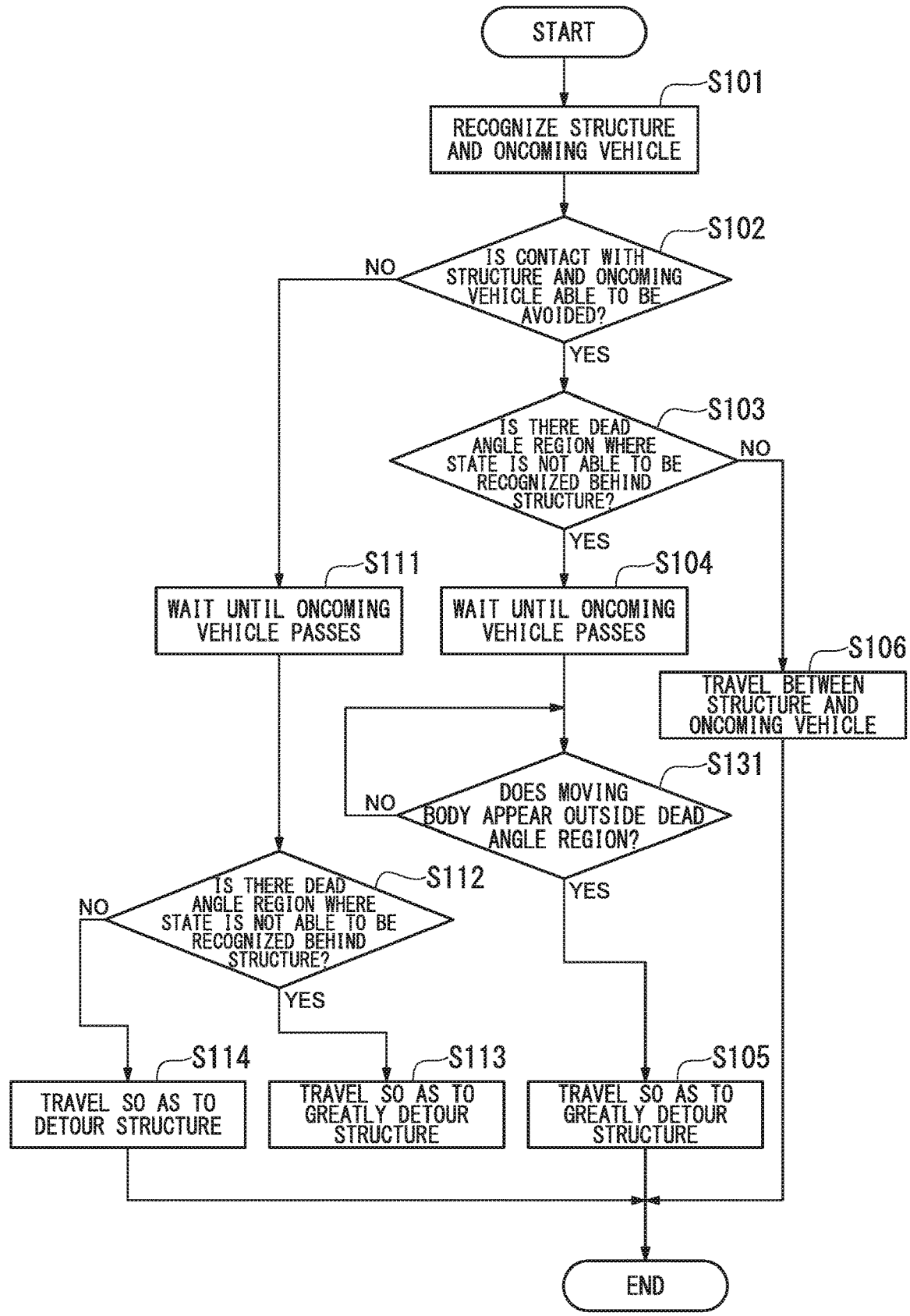
FIG. 9 is a flowchart illustrating an example of a flow of processing executed by the automatic driving control device 100 of a second modification example.

FIG. 9 is a flowchart illustrating an example of a flow of processing executed by the automatic driving control device 100 of the second modification example. In the present modification example, in a case where the avoidance determination unit 140 determines that the contact between each of the structure OB and the oncoming vehicle m and the subject vehicle M is able to be avoided, the waiting necessity or non-necessity determination unit 156 generates a waiting plan for stopping the subject vehicle M and causing the subject vehicle M to wait until the moving body TP appears outside the dead angle region BA although the oncoming vehicle m passes by the subject vehicle M.

That is, in the present modification example, in a case where step S104 is YES, the waiting necessity or non-necessity determination unit 156 determines whether or not the recognition unit 130 recognizes that the moving body TP entering the dead angle region BA is present and the recognition unit 130 recognizes that the moving body TP appears outside the dead angle region BA (step S131). In addition, in a case where the recognition unit 130 recognizes that the moving body TP entering the dead angle region BA is present and the recognition unit 130 does not recognize that the moving body TP appears outside the dead angle region BA, the waiting necessity or non-necessity determination unit 156 repeats the determination of step S131 at a predetermined sampling period.

In addition, in a case where the recognition unit 130 recognizes that the moving body TP entering the dead angle region BA appears outside the dead angle region BA, the waiting necessity or non-necessity determination unit 156 ends generating the waiting plan. In this case, for example, the second control unit 160 travels so as to greatly detour the structure OB and passes the side of the structure OB (step S105). In addition, in a case where the waiting necessity or non-necessity determination unit 156 repeats the determination of step S131 at the predetermined sampling period, the waiting necessity or non-necessity determination unit 156 may proceed to the processing of step S105, in a case where the recognition unit 130 does not recognize that the moving body TP appears outside the dead angle region BA although a predetermined time set according to the size of the dead angle region BA has elapsed.

According to such a constitution, it is possible to cause the subject vehicle M to wait in consideration of the moving body TP entering the dead angle region BA. Therefore, it is possible to perform traveling with more consideration with respect to a traffic participant.

Although the embodiments and the modification examples have been described above, the embodiments are not limited to the above-described examples. For example, in the above-described embodiment, the example in which the structure OB is present on the own lane side (on the left side in the region where the law on the left hand traffic is enforced) is shown. However, the structure OB may be present on another land side (on a right side in the region where the law on the left hand traffic is enforced).

According to the embodiment described above, the recognition unit 130 including the structure recognition unit 132 configured to recognize the structure OB present on the road on which the subject vehicle M travels and the oncoming vehicle recognition unit 134 configured to recognize the oncoming vehicle m and recognizing the surrounding situation of the subject vehicle M, the avoidance determination unit 140 configured to determine whether or not a contact between each of the structure OB and the oncoming vehicle m and the subject vehicle M is able to be avoided on the basis of the position of the structure OB recognized by the structure recognition unit 132 and the position of the oncoming vehicle m recognized by the oncoming vehicle recognition unit 134, and the driving control unit configured to control one or both of the steering or acceleration and deceleration of the subject vehicle M to cause the subject vehicle M to travel and configured to stop the subject vehicle M until the oncoming vehicle m passes by the subject vehicle M in a case where the state of the dead angle region BA of the structure OB is not able to be recognized by the recognition unit 130, even in a case where it is determined that the contact between each of the structure OB and the oncoming vehicle m and the subject vehicle M is able to be avoided by the avoidance determination unit 140 are provided. Therefore, it is possible to perform traveling with more consideration with respect to a traffic participant.

[Hardware Constitution]

Figure 10:
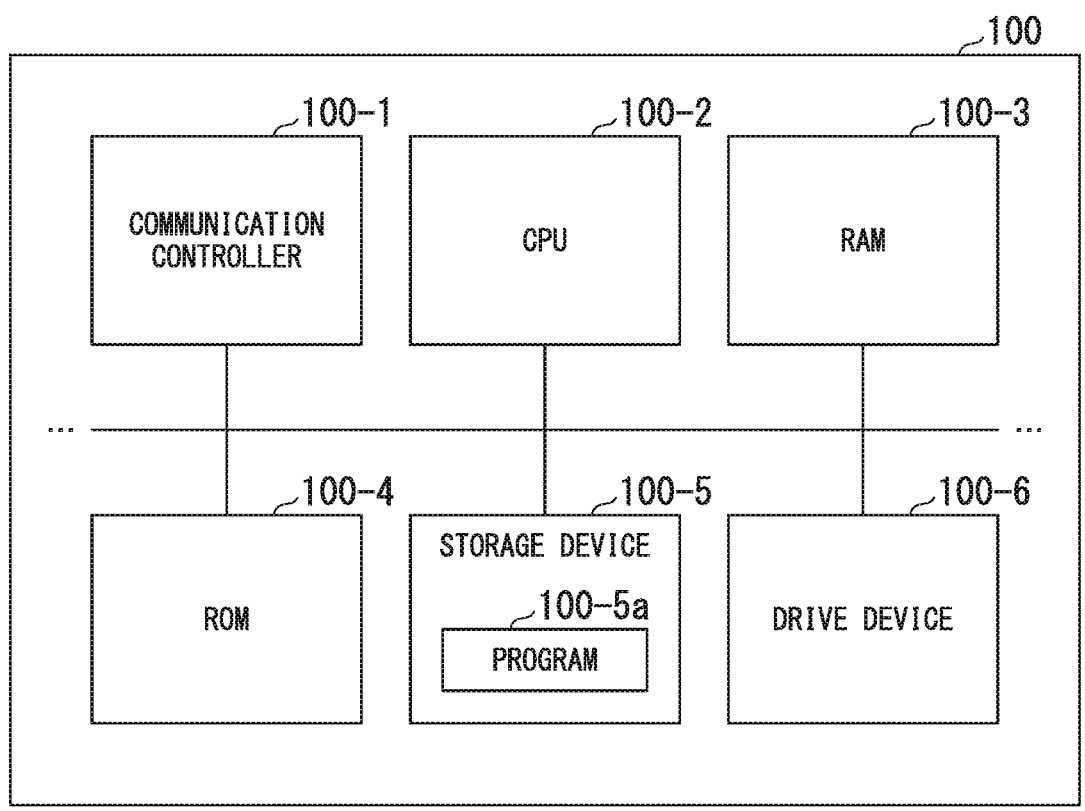
FIG. 10 is a diagram illustrating an example of a hardware constitution of the automatic driving control device 100.

For example, the automatic driving control device 100 of the above-described embodiment is realized by a hardware constitution as shown in FIG. 10. FIG. 10 is a diagram illustrating an example of the hardware constitution of the automatic driving control device 100 of the embodiment.

In the automatic driving control device 100, a communication controller 100-1, a CPU 100-2, a RAM 100-3, a ROM 100-4, a secondary storage device 100-5 such as a flash memory or an HDD, and a drive device 100-6 are mutually connected by an internal or dedicated communication line. A portable storage medium such as an optical disk is attached to the drive device 100-6. The first control unit 120 and the second control unit 160 are realized by developing a program 100-5a stored in the secondary storage device 100-5 in the RAM 100-3 by a DMA controller (not shown) or the like and executing the program 100-5a by the CPU 100-2. In addition, the program referred by the CPU 100-2 may be stored in the portable storage medium attached to the drive device 100-6 or may be downloaded from another device through a network NW.

The above-described embodiment may be expressed as follows.

A vehicle control device that includes a storage device and a hardware processor for executing a program stored in the storage device, wherein the hardware processor executes the program to: recognize a surrounding situation of a subject vehicle; recognize a structure present on a road on which the subject vehicle travels; recognize an oncoming vehicle; determine whether or not a contact between each of the structure and the oncoming vehicle and the subject vehicle is able to be avoided on the basis of a position of the recognized structure and a position of the recognized oncoming vehicle; control one or both of steering or acceleration and deceleration of the subject vehicle to cause the subject vehicle to travel; and stop the subject vehicle until the oncoming vehicle passes by the subject vehicle in a case where a state of a dead angle region of the structure is not able to be recognized, even in a case where it is determined that the contact between each of the structure and the oncoming vehicle and the subject vehicle is able to be avoided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a hardware processor that executes executable components stored on a memory, the executable components comprising:
   a recognition unit configured to recognize at least a structure, an oncoming vehicle, and a moving body present on a road on which a subject vehicle travels and a surrounding situation of the subject vehicle;
   an avoidance determination unit configured to determine whether contact between each of the structure and the oncoming vehicle and the subject vehicle is able to be avoided based on a position of the structure and a position of the oncoming vehicle recognized by the recognition unit; and
   a driving control unit configured to control at least one of steering, acceleration, or deceleration of the subject vehicle to cause the subject vehicle to travel,
   wherein
   a size of a minimum moving body among moving bodies on the road on which the subject vehicle needs to avoid contact is registered in the recognition unit,
   a first gap to be secured between the structure and the subject vehicle in order to avoid a contact between the structure and the subject vehicle is set in the avoidance determination unit, and
   the driving control unit is configured to:
      determine that a dead angle region that cannot be recognized by the recognition unit is present behind the structure in a direction in which the subject vehicle travels based on a determination by the driving control unit that the structure, the oncoming vehicle, and the moving body are present and that the structure has a size that completely shields the minimum moving body or a size that does not completely shield the minimum moving body but is capable of concealing a predetermined ratio or more of the moving body recognized by the driving control unit, and
      in response to a determination by the recognition unit that the dead angle region is present:
         cause the subject vehicle to stop until the driving control unit has determined that the oncoming vehicle has passed by the subject vehicle in a direction opposite to the direction in which the subject vehicle travels, including in a case in which the driving control unit determines that the contact between each of the structure and the oncoming vehicle and the subject vehicle is able to be avoided by the avoidance determination unit,
         generate a trajectory for causing the subject vehicle to pass by a side of the structure by setting a second gap larger than the first gap, and
         in response to recognizing that the oncoming vehicle has passed by the subject vehicle in the opposite direction, cause the subject vehicle to travel along the trajectory.

2. The vehicle control device according to claim 1, wherein, in response to a determination by the recognition unit that the moving body is entering the dead angle region, the driving control unit causes the subject vehicle to stop until the recognition unit recognizes that the oncoming vehicle has passed by the subject vehicle in the direction opposite to the direction in which the subject vehicle travels.

3. A vehicle control method comprising,
   recognizing a surrounding situation of a subject vehicle by a recognition unit comprising one or more hardware processors;
   recognizing, by the recognition unit, a structure, an oncoming vehicle, and a body present on a road on which the subject vehicle travels;
   determining, by an avoidance determination unit comprising the one or more hardware processors, whether contact between each of the structure and the oncoming vehicle and the subject vehicle is able to be avoided based on a position of the structure and a position of the oncoming vehicle recognized by the recognition unit; and
   controlling, by a driving control unit comprising the one or more processors, at least one of steering, acceleration, or deceleration of the subject vehicle to cause the subject vehicle to travel, wherein
   a size of a minimum moving body among moving bodies on the road on which the subject vehicle needs to avoid contact is registered in the recognition unit in advance, and
   the controlling comprises:
      determining that a dead angle region that cannot be recognized by the recognition unit is present behind the structure in a direction in which the subject vehicle travels based on a recognition by the driving control unit that the structure, the oncoming vehicle, and the moving body are present and that the structure has a size that completely shields the minimum moving body or a size that does not completely shield the minimum moving body but is capable of concealing a predetermined ratio or more of the moving body recognized by the driving control unit;
      in response to determining that the dead angle region is present, causing the subject vehicle to stop until the driving control unit has determined that the oncoming vehicle has passed by the subject vehicle in the direction opposite to the direction in which the subject vehicle travels, including in a case in which the driving control unit determines that the contact between each of the structure and the oncoming vehicle and the subject vehicle is able to be avoided by the avoidance determination unit; and in response to determining that the moving body is entering the dead angle region, causing the subject vehicle to stop until the recognition unit recognizes that the oncoming vehicle has passed by the subject vehicle in the direction opposite to the direction in which the subject vehicle travels.

4. A non-transitory computer readable storage medium storing a program that causes a computer mounted in a subject vehicle to:
   register a size of a minimum moving body among moving bodies that a subject vehicle needs to avoid contact with on a road on which the subject vehicle travels;
   recognize a surrounding situation of the subject vehicle;
   recognize a structure, an oncoming vehicle, and a body present on the road;
   determine whether contact between each of the structure and the oncoming vehicle and the subject vehicle is able to be avoided based on a position of the structure and a position of the oncoming vehicle;
   control at least one of steering, acceleration, or deceleration of the subject vehicle to cause the subject vehicle to travel;
   in response to recognizing that the structure, the oncoming vehicle, and the moving body are present and that the structure has a size that completely shields the minimum moving body or a size that does not completely shield the minimum moving body but is capable of concealing a predetermined ratio or more of the moving body, determine that a dead angle region that cannot be recognized by the computer is present behind the structure in a direction in which the subject vehicle travels;
   in response to determining that the dead angle region is present, cause the subject vehicle to stop until the computer determines that the oncoming vehicle has passed by the subject vehicle in the direction opposite to the direction in which the subject vehicle travels, even in a case in which it is determined that the contact between each of the structure and the oncoming vehicle and the subject vehicle is able to be avoided; and
   in response to determining that the moving body is entering the dead angle region, causing the subject vehicle to stop until the computer recognizes that the oncoming vehicle has passed by the subject vehicle in the direction opposite to the direction in which the subject vehicle travels.

\* \* \* \* \*